United States Patent
Pickard et al.

(10) Patent No.: US 12,056,810 B2
(45) Date of Patent: Aug. 6, 2024

(54) VIRTUAL THERMAL CAMERA IMAGING SYSTEM

(71) Applicant: EIGEN INNOVATIONS INC., Fredericton (CA)

(72) Inventors: Joshua Pickard, Fredericton (CA); Scott Everett, Fredericton (CA); Jacob Wilson, Fredericton (CA); Joel Murray, Fredericton (CA)

(73) Assignee: EIGEN INNOVATIONS INC., Fredericton (CA)

( * ) Notice: Subject to any disclaimer, the term of this patent is extended or adjusted under 35 U.S.C. 154(b) by 55 days.

(21) Appl. No.: 17/782,586

(22) PCT Filed: Dec. 6, 2019

(86) PCT No.: PCT/CA2019/051759
§ 371 (c)(1),
(2) Date: Jun. 3, 2022

(87) PCT Pub. No.: WO2021/108885
PCT Pub. Date: Jun. 10, 2021

(65) Prior Publication Data
US 2023/0007862 A1    Jan. 12, 2023

(51) Int. Cl.
*G06T 15/20* (2011.01)
*G06N 3/08* (2023.01)

(52) U.S. Cl.
CPC ............. *G06T 15/205* (2013.01); *G06N 3/08* (2013.01); *G06T 2207/20081* (2013.01)

(58) Field of Classification Search
CPC .................... G06T 15/205; G06T 2207/20081
See application file for complete search history.

(56) References Cited

U.S. PATENT DOCUMENTS

| | | | |
|---|---|---|---|
| 7,689,003 B2 | 3/2010 | Shannon et al. | |
| 8,332,057 B2 | 12/2012 | Dubay et al. | |
| 9,305,390 B2 | 4/2016 | Schlichte et al. | |
| 10,268,927 B2 | 4/2019 | Everett et al. | |
| 2011/0298800 A1 | 12/2011 | Schlichte et al. | |
| 2014/0175071 A1* | 6/2014 | Pfitzner | B23K 26/244 348/90 |
| 2016/0039046 A1* | 2/2016 | Franz | B23K 26/24 219/121.64 |
| 2019/0049929 A1* | 2/2019 | Good | B23K 26/342 |
| 2019/0080431 A1* | 3/2019 | Choi | G06V 10/803 |
| 2019/0339131 A1 | 11/2019 | Finn et al. | |
| 2020/0337407 A1* | 10/2020 | Hsu | A42B 3/225 |

(Continued)

FOREIGN PATENT DOCUMENTS

EP    3032495 A1    6/2016
EP    3226208 A1    10/2017

*Primary Examiner* — Terrell M Robinson
(74) *Attorney, Agent, or Firm* — David J. Greer; Smart & Biggar LP

(57) ABSTRACT

System and method that includes mapping temperature values from a two dimensional (2D) thermal image of a component to a three dimensional (3D) drawing model of the component to generate a 3D thermal model of the component; mapping temperature values from the 3D thermal model to a 2D virtual thermal image corresponding to a virtual thermal camera perspective; and predicting an attribute for the component by applying a prediction function to the 2D virtual thermal image.

25 Claims, 9 Drawing Sheets

(56) References Cited

U.S. PATENT DOCUMENTS

2020/0355601 A1* 11/2020 Amer ..................... G06N 3/084
2023/0004762 A1* 1/2023 Vallespi-Gonzalez .......................
G06V 20/58

* cited by examiner

VIRTUAL THERMAL CAMERA IMAGING SYSTEM

RELATED APPLICATIONS

None

FIELD

This disclosure relates generally to industrial thermal imaging systems.

BACKGROUND

The cost of quality for industrial manufacturing, particularly costs associated with inspection and prevention, can negatively impact profitability. Highly automated, high volume industrial processes require extensive amounts of information to be captured and analyzed. In this regard, industrial imaging systems, including thermal imaging systems, can be used to capture information about an industrial process for inspection and/or control purposes, and combined with machine learning systems that aid in the analysis and processing of such information.

The information about an industrial process that is captured by a thermal imaging system may be inconsistent and/or include noise. For example, relative locations of imaging systems and target objects may vary over time as well as from machine to machine in an industrial process, and imaging systems may have partially obscured views. Accordingly, there is a need to extract information from the data produced by an imaging system in a manner that can optimize the use of such data both for direct real-time application as well as for training purposes.

SUMMARY

According to an example aspect, this disclosure describes a system and method that includes mapping temperature values from a two dimensional (2D) thermal image of a component to a three dimensional (3D) drawing model of the component to generate a 3D thermal model of the component; mapping temperature values from the 3D thermal model to a 2D virtual thermal image corresponding to a virtual thermal camera perspective; and predicting an attribute for the component by applying a prediction function to the 2D virtual thermal image.

According to a further example embodiment is a system comprising a thermal image camera for scanning a component at an industrial process to generate an observed 2D thermal image of the component at predetermined location in the industrial process, the 2D thermal image comprising a two dimensional array of pixels each having an assigned temperature values; and one or more processing units that each comprise a processing device and a storage storing instructions for the processing device, the instructions collectively configuring the one or more processing units to: generate a 3D thermal model of the component by mapping the temperature values to respective polygons of a three dimensional (3D) drawing model of the component based on an expected perspective of the thermal image camera relative to the component; generate a 2D virtual thermal image corresponding to a virtual thermal camera perspective by mapping temperature values from the 3D thermal model based on the virtual thermal camera perspective; and predict an attribute for the component by applying a prediction function to the 2D virtual thermal image.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
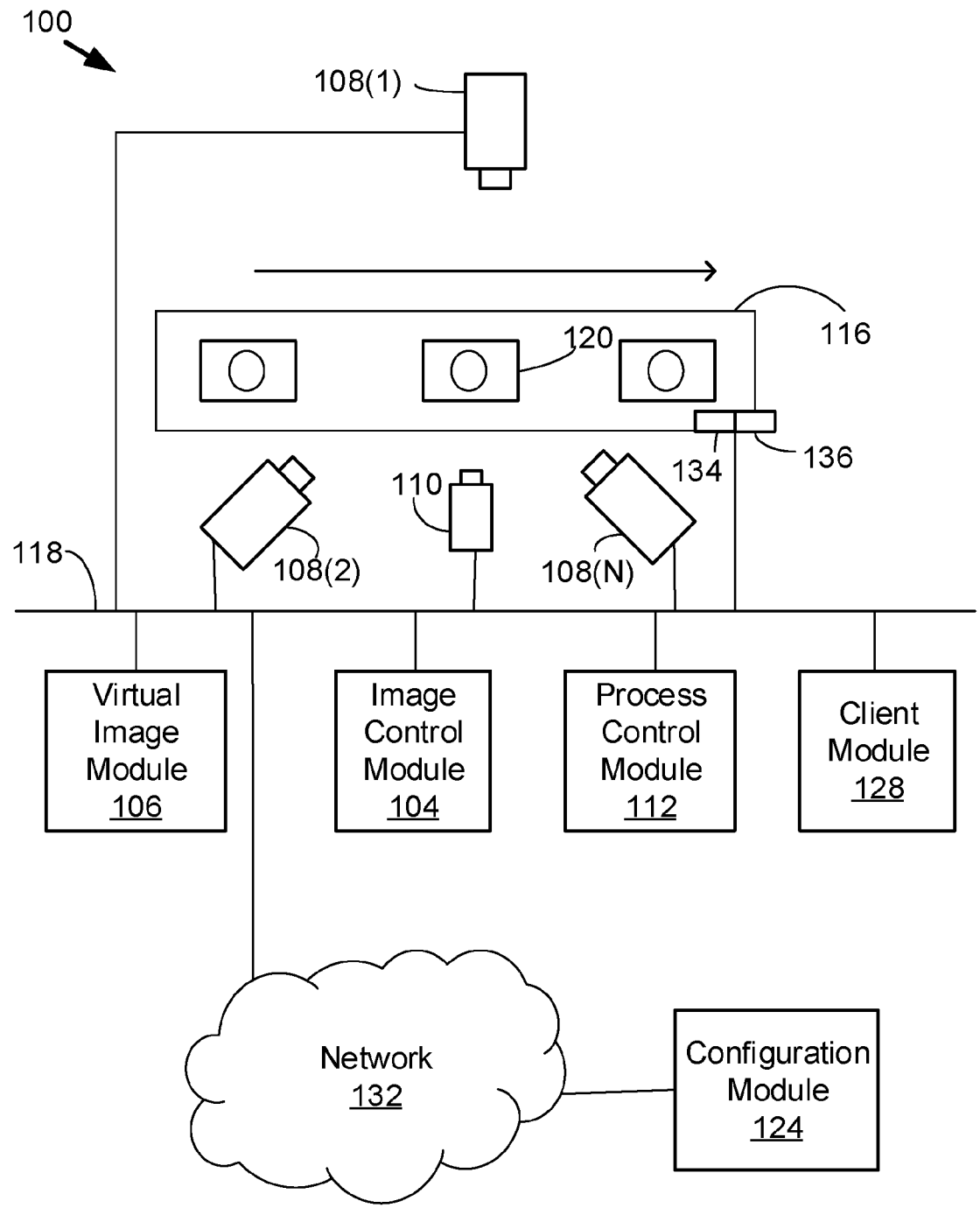
FIG. 1 is a block diagram illustrating a system that includes thermal imaging elements according to example embodiments.

FIG. 1 depicts a system 100 that incorporates thermal imaging for industrial process applications. In example embodiments, the elements of system 100 include one or more thermal image cameras 108(1) to 108(N) (referred to generically as thermal image camera(s) 108), one or more optical image cameras 110, image control module 104, virtual image module 106, process control module 112, configuration module 124 and client module 128. In example embodiments, thermal image cameras 108, optical image camera 110, image control module 104, virtual image module 106, process control module 112 and client module 128 may be located at an industrial process location or site and enabled to communicate with an enterprise or local communications network 118 that includes wireless links (e.g. a wireless local area network such as WI-FI™ or personal area network such as Bluetooth™), wired links (e.g. Ethernet, universal serial bus, network switching components, and/or routers, or a combination of wireless and wireless communication links. In example embodiments, configuration module 124 may be located at a geographic location remote from the industrial process location and connected to local communications network 118 through a further external network 132 that may include wireless links, wired links, or a combination of wireless and wireless communication links. External network 132 may include the Internet. In some examples, one or more of image control module 104, virtual image module 106, process control module 112, and client module 128 may alternatively be distributed among one or more geographic locations remote from the industrial process location and connected to the remaining modules through external network 132. In some examples, configuration module 124 may be located at the industrial process location and directly connected to local communications network 118.

In some examples, image control module 104, virtual image module 106, process control module 112, configuration module 124 and client module 128 may be implemented using a suitably configured processor enabled computer devices or systems such as personal computers, industrial computers, laptop computers, computer servers and programmable logic controllers. In some examples, individual modules may be implemented using a dedicated processor enabled computer device, in some examples multiple modules may be implemented using a common processor enabled computer device, and in some examples the functions of individual modules may be distributed among multiple processor enabled computer devices. Further information regarding example processor enabled computer device configurations will be described below.

In example embodiments, each thermal image camera 108 is a processor enabled device configured to capture thermal data. In particular, each thermal camera is configured to measure emitted infrared (IR) radiation from a scene and calculate surface temperature of one or more objects within the scene based on the measured radiation. In some example embodiments, each thermal image camera 108 generates a structured data output in the form of a series of thermal images that each include a two-dimensional (2D) array (X, Y) of temperature values. The temperature values each represent a respective temperature calculated based on radiation measured from a corresponding point or location of an observed scene. Thus, each thermal image includes geospatial information based on the location of temperature values in the elements (referred to as pixels) within the 2D array and temperature information in the form of the temperature values themselves. By way of non-limiting example, each thermal image may have a resolution of X=320 by Y=256 pixels that are each assigned a respective calculated temperature value, although other resolutions can alternatively be used. Each thermal image camera 108 may generate several thermal images (also referred to as frames) per second. By way of non-limiting example, each thermal image camera 108 may scan 60 frames per second, with each frame being an X by Y array of temperature values, although other frame rates may also be used. In some examples, the calculated temperature values included in a thermal image may be a floating point temperature value such as a value in degrees Kelvin or Celsius. In some examples, each pixel in a thermal image may map to or include a respective color value (for example an RGB color value) that can be used by a display device to visually represent measured thermal data.

In example embodiments, thermal image cameras 108 are arranged to capture a scene that includes one or more target components 120 such that the thermal images generated by thermal image cameras 108 includes thermal image data about the one or more target components 120.

In example embodiments, virtual image module 106 is configured to receive observed thermal image data about target components 120 in the form of thermal images from one or more thermal image cameras 108. As will be explained in greater detail below, virtual image module 106 is configured to optimize the observed thermal image data for the target component 120, overlay the optimized thermal image data onto a three dimensional (3D) representation of the target object, and then generate a virtual two dimensional (2D) thermal image of the target component 120 for one or more virtual camera viewing perspectives. In some examples, virtual image module 106 may combine thermal image data from multiple thermal image cameras 108 to generate virtual 2D thermal images of a target component 120.

Image control module 104 is configured to receive virtual thermal image data from virtual image module 106, and in some examples, optical image data from one or more optical image cameras 110. The image control module 104 is configured to process the received image data and take actions based on such processing. In some examples, the actions may include classifying a target component 120 as passing or failing a quality standard. In some examples, the actions may include generating control instructions for process control module 112. In some examples, the actions may include transmitting data, including image data, to configuration module 124 and/or client module 128.

Process control module 112, is configured to act on instructions received from image control module 104 to control an industrial processes 116. Industrial process control module 112 may also be coupled to a plurality of industrial process sensors 134 that monitor various aspects of industrial process 116 and control units 136 that control various aspects of industrial process 116.

Configuration module 124 is configured to receive data, including image data, from image control module 104 and other sources and provide configuration information to image control module 104 based on such data. In example embodiments, configuration module 124 may receive data from several image control modules 104 and use the combined data to generate configuration information for a plurality of image control modules 104.

Client module 128 may be configured to allow users at the industrial process location to interact with the other modules and components of system 100.

The configuration and operation of system 100 will now be described in greater detail in accordance with example embodiments. Although system 100 can be applied to any process in which thermal image data is collected, in an illustrative embodiment the industrial process 116 is an automated thermal welding process in which two or more polymeric components are joined together by heating respective plastic surfaces of the components and applying pressure to bring the softened heated surfaces into contact. Once cooled, a strong, durable leak-proof connection joint is ideally formed between the two components.

Figure 2:
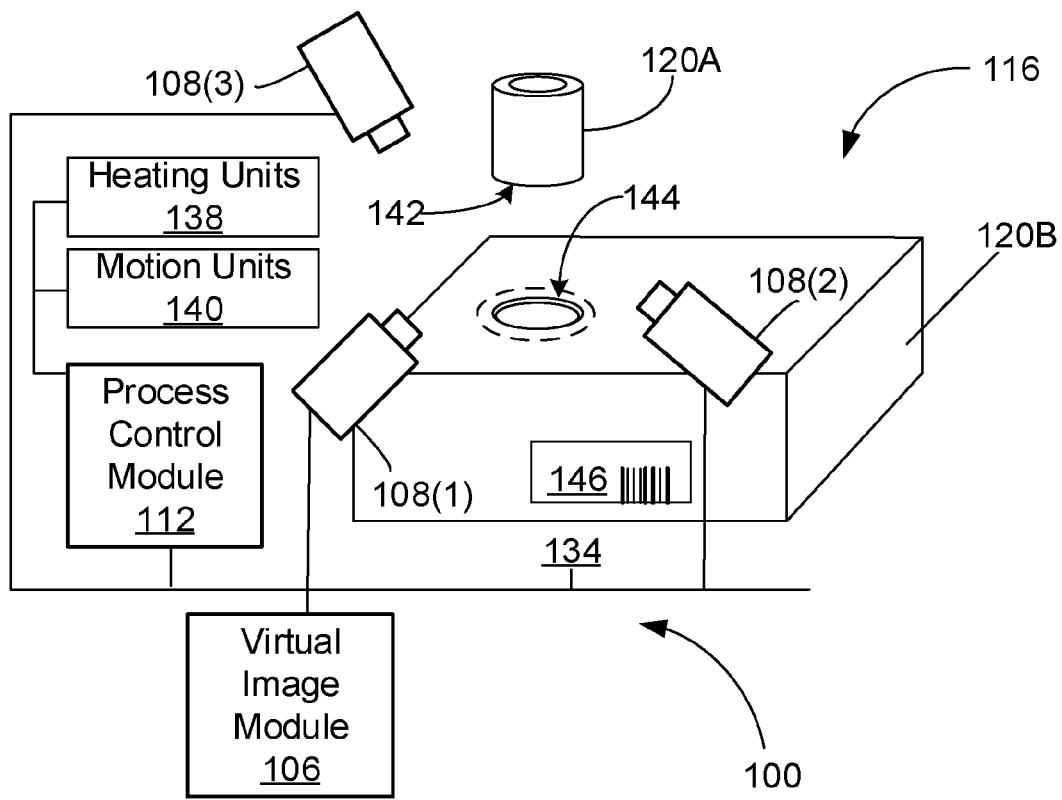
FIG. 2 is a block diagram illustrating parts of the system of FIG. 1 applied to a thermal welding process.

In this regard, FIG. 2 is a block diagram illustrating an example of an industrial process 116 that includes a thermal polymeric welding process. In the industrial process 116 of FIG. 2, respective surface regions 142, 144 of two plastic components 120A and 120B are heated and then subsequently pressed together to join the components 120A and 120B to form assembled component 120. In this regard, industrial process 116 may include multiple heating units 138 that are controlled by process control module 112 to selectively heat respective component surface regions 142, 144, and multiple robotic component motion units 140 (e.g. robotic arms and/or conveyer belts) that are controlled by process control module 112 to maneuver and manipulate components 120A and 120B throughout the polymeric welding process. Heating units 138 and motion units 140 may each have associated local process sensors 134 and control units 136 that function as interfaces between the heating units 138 and motion units 140 and the process control module 112.

By way of illustrative example, components 102A and 120B may be parts of a fuel tank system, with component 120A being a fill nozzle component and component 120B being a tank component that are joined together to form fuel system tank component 120. The formation of a strong, durable, leak-proof joint between fill nozzle component 120A and tank component 120B that meets predefined criteria is a primary objective of industrial process 116. In the example of FIG. 2, system 100 includes three thermal image cameras 108(1), 108(2) and 108(3) to monitor the polymeric welding process. Thermal image cameras 108(1) and 108(2) are each positioned to capture respective thermal images of the surface region 142 of fill nozzle component 120A. In example embodiments, two thermal image cameras 108(1), 108(2) may be required as both cameras may have partially obstructed views of surface region 142. Thermal image camera 108(3) is positioned to capture respective thermal images of the surface region 144 of tank component 120B. In example embodiments, thermal image cameras 108(1), 108(2) 108(3) may be pre-calibrated to focus on IR emissions from certain regions within a scene and/or within specified magnitude thresholds in order to filter extraneous information from the captured thermal images.

Components 120A, 120B and assembled component 120 are associated with one or more unique identifiers 146 that enable the components to be tracked through industrial process 116. For example, tank component 120B could have a component identifier (ID) 146 that is applied to a machine readable label (e.g. barcode or RFID tag) that can be read by process sensors 134. The component ID 146 may include a unique ID for the component 120 that enables it to be tracked throughout the industrial process and to a final customer. The component ID 146 may also include a model or part identifier and other information. Fill nozzle component 120A may have its own unique component ID 146 and/or may become associated with the unique component ID 146 of the tank component 120B that it is welded to.

In example embodiments, automated elements of industrial process 116 are controlled by process control module 112 to operate as follows. Motion units 140 are controlled to position components 120A, 120B at predetermined heating locations to enable their respective surface regions 142, 144 to be heated. Heating units 138 are controlled to apply heat to respective surface regions 142, 144. In some examples, heating units 138 may include movable heating elements that are moved to locations proximate surface regions 142, 144 to apply heat and then retracted. Motion units 140 are then controlled to at least one of the components 120A, 120B into contact with the other so that their respective surface regions 142, 144 engage each other with a predetermined amount of pressure to allow a bond to form.

During such operation, thermal image cameras 108(1), 108(2), 108(3) capture thermal image data about components 120A, 120B in the form of thermal images or frames as described above. Included in the captured images are one or more images of fill nozzle component 120A and tank component 120B during a brief time period that is subsequent to the heating of surface regions 142, 144 and prior to joining of the two components 120A 120B.

Industrial process 116 is configured such that the one or more thermal images of components 120A, 120B at the pre-heating, pre-joining stage are captured at time period when the relative location and orientation of thermal image cameras 108(1), 108(2) to component 120B and thermal image camera 108(3) to component 120A are known. Accordingly, in example embodiments industrial process 116 is preconfigured such that thermal image data of the welding process is captured using an expected set of geospatial parameters for each of the imaging cameras 108. In the illustrated example, the expected geospatial parameters includes an expected viewing perspective (e.g. component angle and orientation) and distance (e.g. X, Y, Z Cartesian location) of the target component relative to the thermal imaging camera that is scanning that component. In at least some example applications, the actual geospatial parameters of components 120 relative to thermal imaging cameras 108 may vary from the expected geospatial parameters due to noise inherent in the industrial process.

Figure 3:
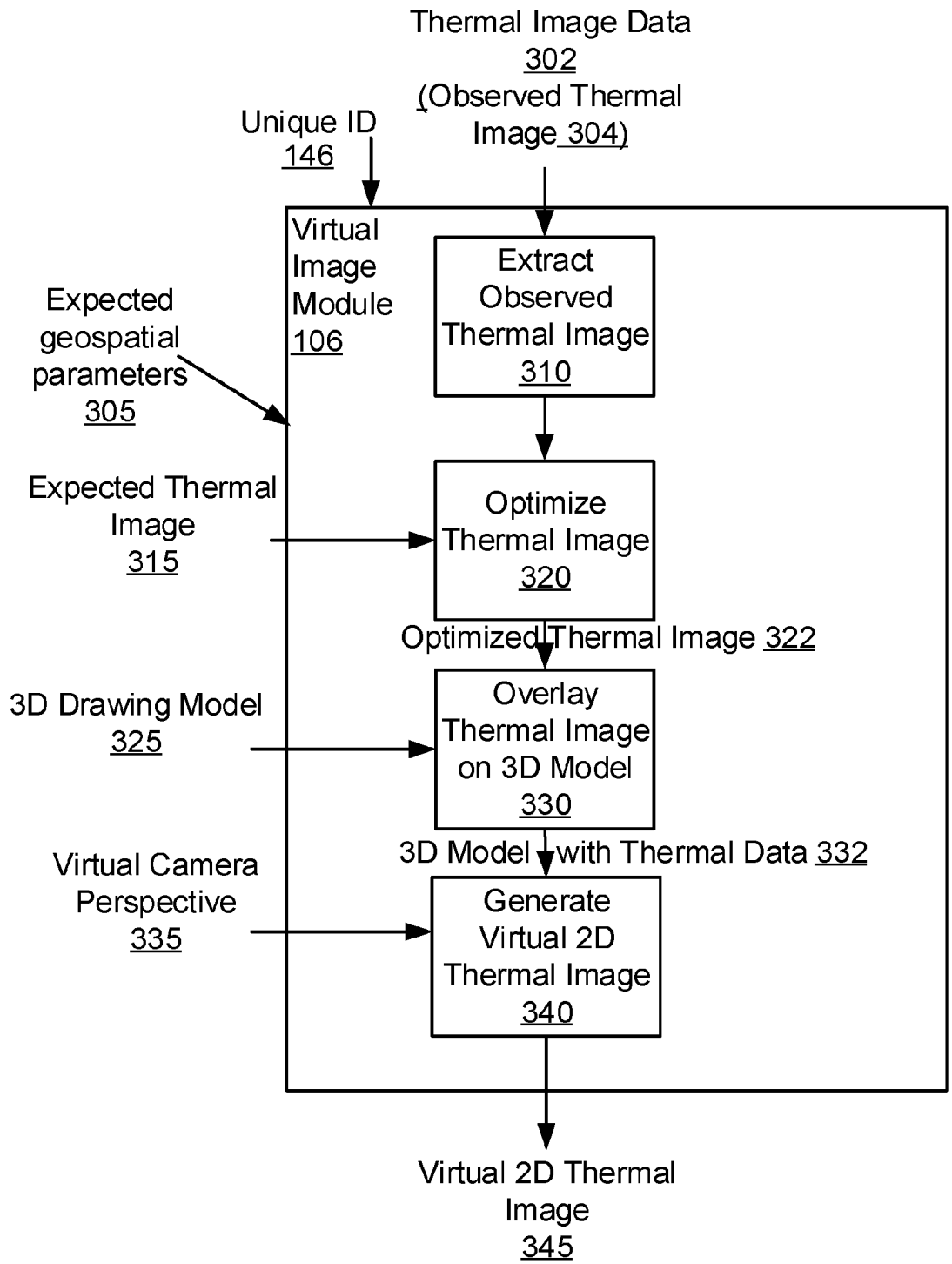
FIG. 3 is a block diagram of operations performed by a virtual image module of the system of FIGS. 1 and 2 according to example embodiments.

The processing of thermal image data from a thermal image camera 108 in respect of a target component by virtual image module 106 will now be described with reference to FIG. 3, which is a block diagram of operations performed by virtual image module 106 according to example embodiments. By way of illustration, processing of data generated by thermal image camera 108(1) in respect of fill nozzle component 120A will be described. As indicated in FIG. 3, virtual image module 106 receives thermal image data 302 as input from thermal image camera 108(1). Virtual image module 106 may also receive as input the expected geospatial parameters 305 that correspond to the thermal image data 302 (e.g. the geospatial parameters that specify the expected relative location of fill nozzle component 120A to thermal image camera 108(1)). In some examples, the expected geospatial parameters could be provided by one of the other system modules (for example one or more of modules 104, 112, 128 and 124) and provided to virtual image module 106. In some examples, virtual image module 106 may be pre-configured with the expected geospatial parameters prior to performing the operations shown in FIG. 3. In example embodiments, virtual image module 106 is also provided with the component ID 146 for the specific component that is represented in the thermal image data. For example, an ID reading sensor 134 may read the component ID 146 at the industrial process 116 and provide such information to a further module such as process control module 112 for forwarding to virtual image module 106. In some example embodiments the component ID 146 may be embedded as part of the thermal image data 302 sent to the virtual image module 106.

As indicated by operation 310, virtual image module 106 is configured to extract a selected observed thermal image 304 from the thermal image data 302. As noted above, in at least some examples, thermal image data 302 may include multiple successive frames of thermal image data showing nozzle component 120A at the post-heating, pre-joining stage. Although the processing described herein may be done using data from multiple frames, in at least some example embodiments a single frame is selected for use as the observed thermal image 304. In some examples, the observed thermal image 304 is selected from the received image frames included in thermal image data 302 based on predetermined criteria. For example, a frame corresponding to a predetermined point in time during the post-heating, pre-joining stage may be selected as the observed thermal image 302. In some examples, observed thermal image extraction could be performed at system module or element other than virtual image module 106 and virtual image module in which case operation 310 can be performed elsewhere, for example at the thermal camera 308.

As noted above, in some industrial process applications, the actual geospatial parameters used to capture observed thermal image 304 may vary from the expected geospatial parameters 305. For example, the relative location and orientation of component 120A to thermal image camera 108(1) may drift over time from the originally configured expected geospatial parameters 305. As also noted above, an observed thermal image includes a 2D array of pixels that each have an assigned temperature value. The locations of temperature values within the 2D array is a function of the relative geospatial positioning of fill nozzle component 120A to thermal image camera 108(1). If the actual geospatial parameters at the time of thermal scanning for the thermal image are different than the expected geospatial parameters 305 then the observed thermal image is captured in what can be considered sub-optimal conditions and the locations of temperature values in the 2D array that defines the observed thermal image 304 may not correspond to the locations that they would be located in if optimal conditions existed at the time the observed thermal image was captured. For example, some or all of the temperature values corresponding to IR emissions from the surface region 142 and other regions of component 120A may be shifted in the pixels of observed thermal image to non-optimal array locations that do not correspond to the array locations where such temperature values would be expected under optimal conditions.

Figure 4:
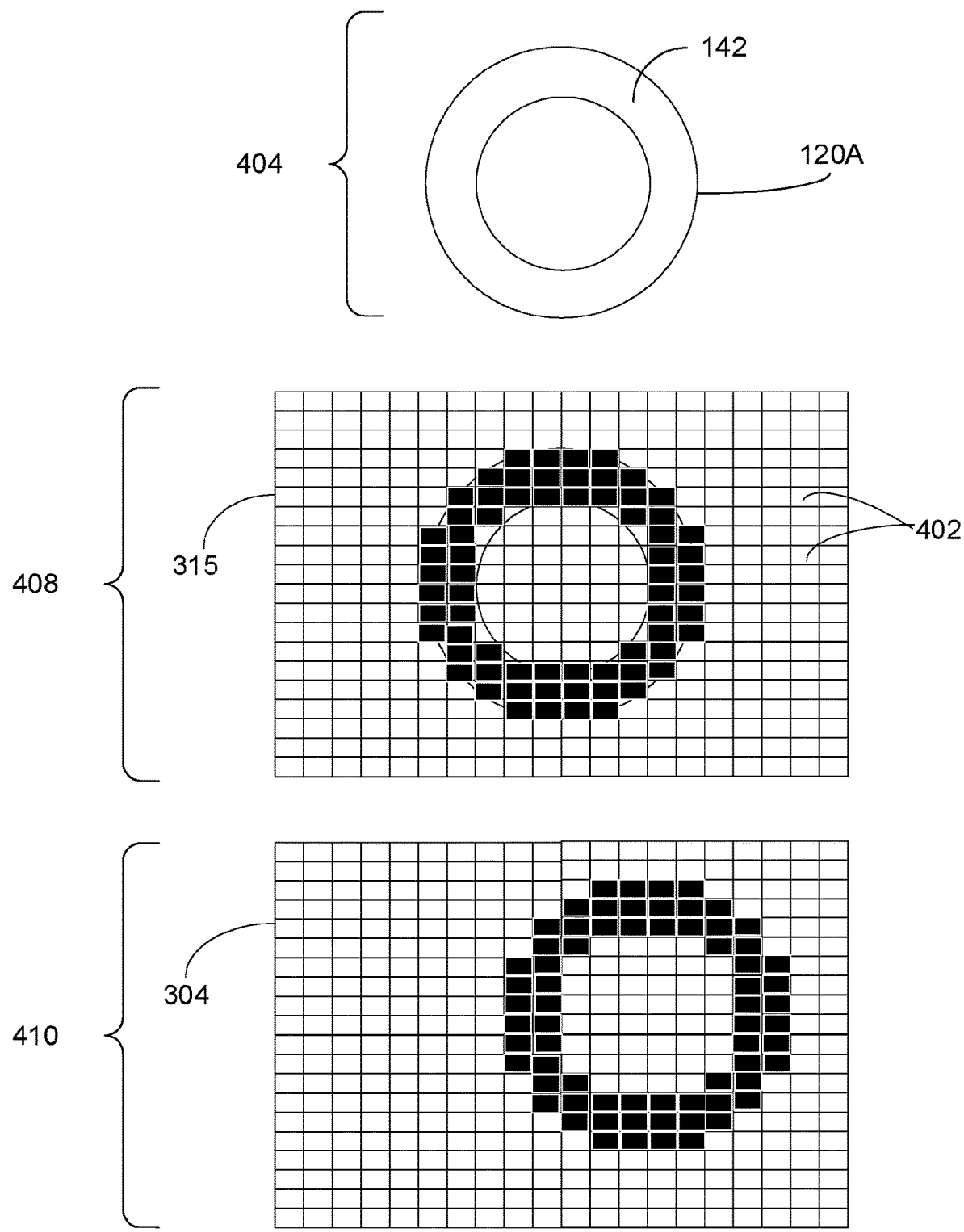
FIG. 4 is a simplified illustration of a component, an expected thermal image of the component and an observed thermal image of the component.
Figure 8:
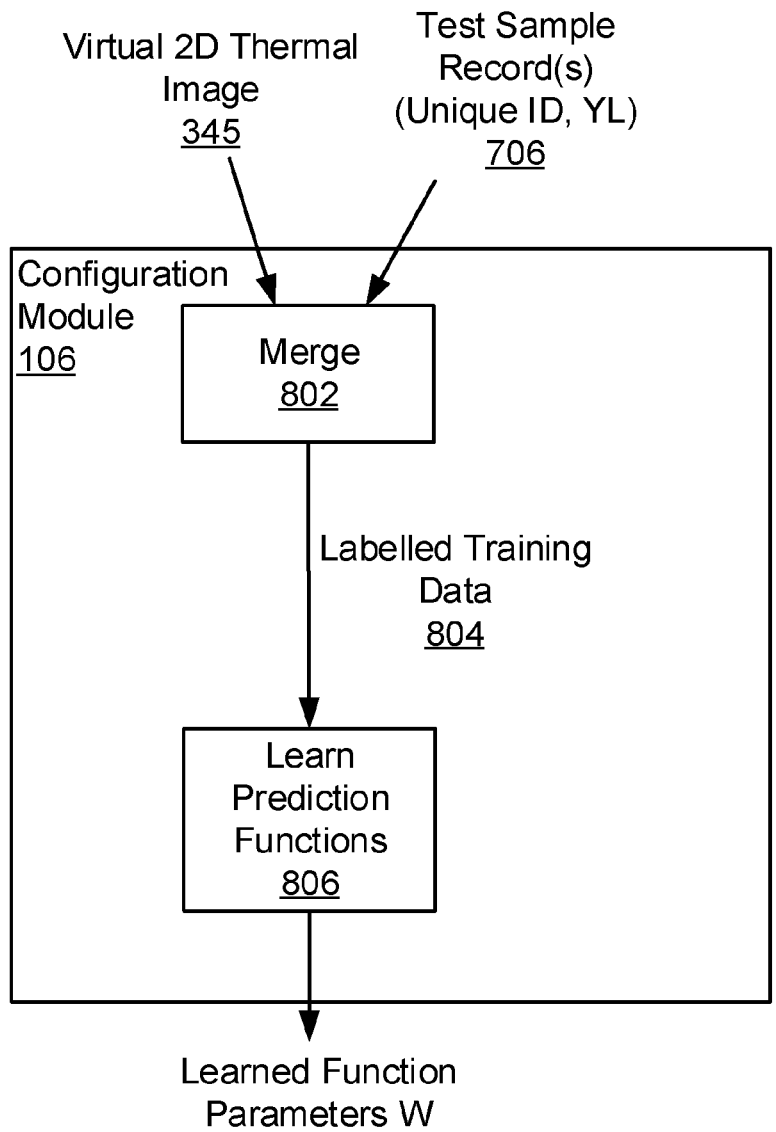
FIG. 8 is a block diagram of operations performed by a configuration module of the system of FIGS. 1 and 2 according to example embodiments.

A simplified example of sub-optimal conditions are illustrated in FIG. 4, where bracket 404 illustrates a plan end view showing surface region 142 of nozzle component 120A. Bracket 408 graphically illustrates a corresponding representation of an expected thermal image 315 of the nozzle component 120A as temperature values (represented as black blocks for illustrative simplicity) assigned to pixels 402 of a 2D thermal image. Expected thermal image 315 reflects the expected temperature profile for nozzle component 120A for the expected geophysical parameters 305. The expected geophysical parameters 305 are embedded in the relative locations and magnitudes of the temperature values within the pixel array indicated by bracket 408. Bracket 410 is a simplified illustrative example of a corresponding observed thermal image 304 representing thermal temperature values calculated in respect of surface region 142 of nozzle component 120A by thermal image camera 108(1) in the context of actual geospatial parameters. As can be seen by comparing the thermal profiles of expected thermal image 315 and observed thermal image 304, the temperature value locations in the observed thermal profile is shifted by a few pixels in both the X and Y directions of the pixel array. Thus, the observed thermal profile for the component 102A is in sub-optimal location within the thermal image frame for future processing. Although the introduced noise shown in FIG. 8 is illustrated as just a simple 2D shift, difference between the expected and actual geophysical parameters could also cause skewing and disproportionality of the temperature profile and differences in the magnitude of the temperature values themselves.

Accordingly, in example embodiments, virtual image module 106 is configured to perform a thermal image optimization operation 320 in respect of observed thermal image 304 to adjust for differences between the expected and actual geospatial parameters. In example embodiments, thermal image optimization operation 320 is implemented using an optimization function that is configured to determine an optimized realization of the observed thermal image 304. In some example embodiments, the virtual image module 106 is provided with expected thermal image data that includes a sample of an expected thermal image (such as thermal image 315 illustrated by bracket 408) that corresponds to a thermal image captured using with the expected geospatial parameters 305. Thus, the expected thermal image 315 inherently embeds the expected geospatial parameters 305.

The optimization function determines how to shift or otherwise manipulate temperature values within the 2D array of the observed thermal image 304 to best fit the geospatial profile of the expected thermal image. In some examples, the optimization is repeated until a predetermined loss function achieves a threshold value, resulting in an optimized realization of observed thermal image 304 in which the locations of the temperature values in the 2D array have been shifted so that the geospatial parameters embedded in the optimized observed thermal image are converged within an acceptable degree to the expected geospatial parameters. A possible example of an optimization algorithm that could be applied is a stochastic population based method such as Differential Evolution. In at least some example embodiments the optimization algorithm is a non-deterministic stochastic algorithm that will produce results that are randomized, within pre-defined constraints, such that the optimized thermal image 322 realized for a particular observed thermal image 304 may not be identical between for different iterations of the algorithm. As will be explained in below, this constrained randomness may be used to provide training data for machine learning performed by other modules of system 100.

Thus, the optimized thermal image 322 provides a best fit estimation of a 2D representation of the component 120B from a predefined viewing angle corresponding to the expected geospatial parameters. In example embodiments, virtual image module 106 is provided with a 3D drawing model 325 of the component 120B. For example, the 3D drawing model may take the form of a computer aided design (CAD) file that includes drawing data defining the 3D physical shape of component 120A as sets of points called vertices (or vertexes) that form polygons. A polygon (also known as a face) is an area formed from at least three vertexes (a triangle). Virtual image module 106 is configured to implement a thermal overlay operation 330 that includes assigning the polygons with respective thermal temperature values to generate a 3D thermal model 332. Using the expected geospatial parameters 305, techniques similar to those known for overlaying 2D pixel data such as RGB values for 2D optical images may be used to map temperature values from the optimized thermal image 322 to corresponding polygons of the 3D drawing model 325 to generate 3D thermal model 332. Using such methods, the thermal overlay operation 330 can correlate the expected geophysical parameters 305 for the optimized thermal image 322 with the geophysical parameters of the 3D drawing model 325 to assign temperature values from the pixels of optimized thermal image 322 to corresponding polygons of the 3D drawing model 325. The resulting 3D thermal model 332 includes a 3D physical and thermal representation of component 120A in the form of polygons and temperature values assigned to the polygons.

In example embodiments, virtual image module 106 is provided with one or more virtual camera perspectives 335 and is configured to implement a virtual 2D thermal image operation 320 to generate virtual 2D thermal images corresponding to the one or more virtual thermal camera perspectives 335 based on the temperature values and 3D physical model information included in 3D thermal model 332. In this regard, virtual 2D thermal image operation 320 may use known techniques to manipulate 3D physical model information to generate a corresponding virtual 2D image. The temperature values assigned to the relevant polygons that will be represented as pixels in the virtual 2D image can be mapped to the corresponding 2D thermal image pixels to provide a virtual 2D thermal image 345 for a virtual camera perspective.

In summary, in example embodiments, the virtual image module 106 is configured to receive an observed 2D thermal image 304 of a target component, optimize the observed thermal image 304 to account for difference that may exist between actual and expected geospatial parameters, overlay temperature values from the resulting optimized thermal image 322 onto a 3D thermal model 332 of the target component, and then, based on the 3D thermal model 332, generate a virtual 2D thermal image 345 corresponding to a virtual camera perspective.

Virtual image module 106 can also perform the operations described above using thermal image data 302 from thermal image camera 308(2) to generate further virtual thermal image 345 representations of component 120A and using thermal image data 302 from thermal image camera 308(3) to generate virtual thermal images 345 representations of component 120B.

Furthermore, in at least some examples, the thermal image data from multiple thermal image cameras 308 (e.g. cameras 308(1) and 308(2)) can be combined by virtual image module 106 to generate a composite virtual thermal image 345. As noted above, in some applications the different geospatial positioning of thermal image cameras 308(1) and 308(2) relative to component 120A allow each of the thermal image cameras 308(1) and 308(2) to capture IR emissions that may not be in the scanning view of the other thermal image camera 308(1) and 308(2). In this regard, FIG. 5 shows a simplified representation of observed thermal images 304(1) and 304(2) of component 120A captured by thermal image cameras 108(1) and 108(2) respectively in an illustrative example.

Figure 5:
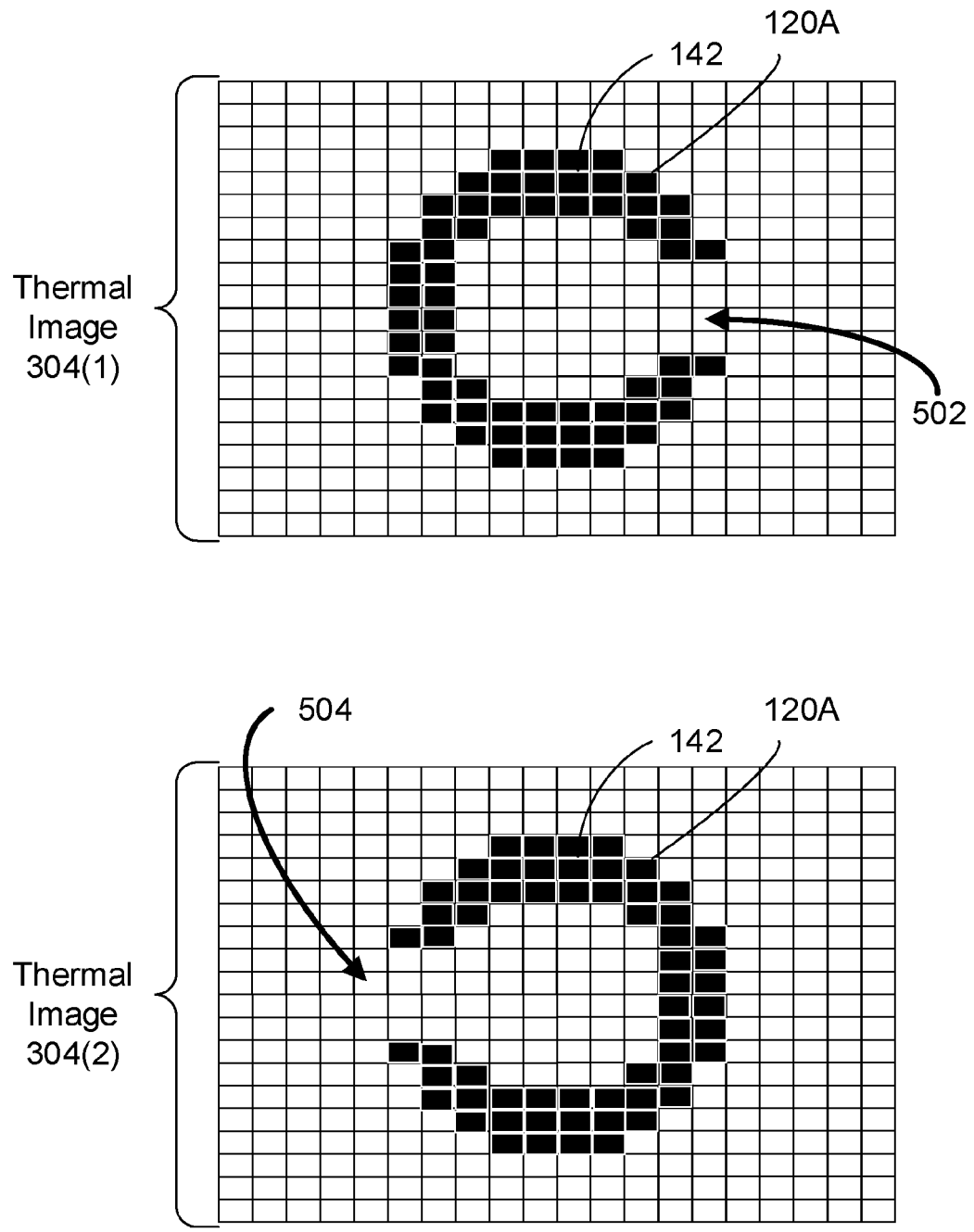
FIG. 5 is a simplified illustration of two partially obstructed thermal images of a component scanned by two different thermal image cameras.

In the example of FIG. 5, region 502 of component 120A is obscured to thermal image camera 108(1) and region 504 of component 120A is obscured to thermal image camera 108(2). Accordingly, a thermal profile for the entire surface region 142 is jointly available from thermal images 304(1) and 304(2) but is not totally available from either image on its own.

Figure 6:
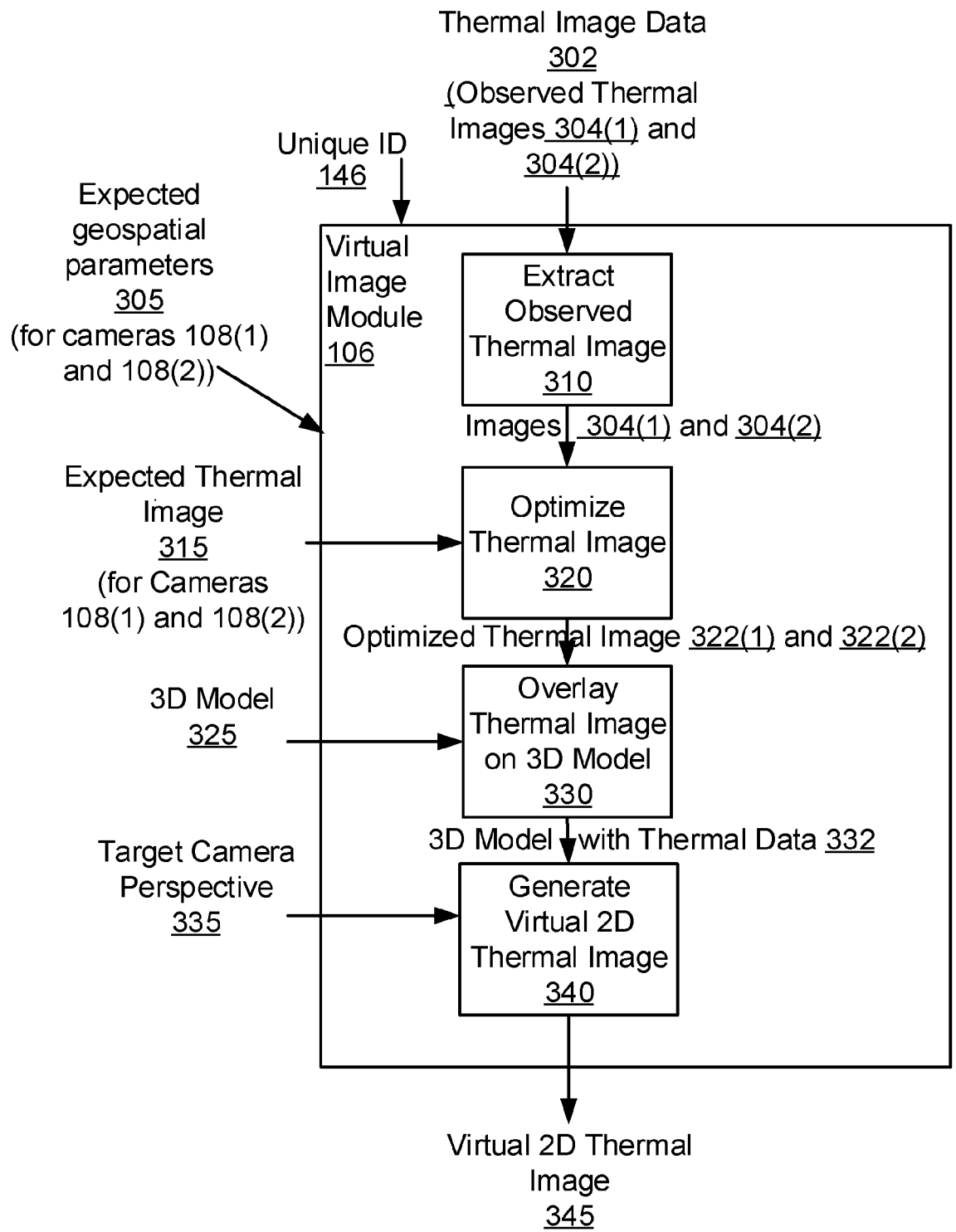
FIG. 6 is a further block diagram of operations performed by a virtual image module of the system of FIGS. 1 and 2 according to example embodiments.

FIG. 6 illustrates the operations of virtual image module 106 that is configured to generate composite virtual thermal images 345 derived from observed thermal images 304(1), 304(2) from multiple thermal cameras 108(1), 108(2) that each have a respective set of geospatial parameters relative to the target object 120. The operations performed in FIG. 6 are the same as those described above in respect of FIG. 3 except for the differences noted below. In example embodiments, virtual image module 106 is configured to perform extraction operation 310 and optimization operation 320 independently for each of observed thermal images 304(1) and 304(2) using expected thermal image data for both cameras 108(1) and 108(2) to generate respective optimized thermal images 322(1) and 322(2). When generating 3D thermal model 332, the overlay operation 330 illustrated in FIG. 6 considers the temperature values available in both of the optimized thermal images 322(1) and 322(2). Temperature values for polygons that map to the obscured region 502 in thermal image 304(1) can be obtained from thermal image 204(2) and vice versa. In cases where both optimized thermal images 322(1) and 322(2) include temperature values corresponding to the same pixels, the temperature data selected for the corresponding polygon can be determined according to predetermined rules. Such rules could for example just include a rule that for a first predetermined group of pixels (e.g. all pixels in left half of image) the temperature values from one predetermined image (e.g. thermal image 322(1)) are to be used. In some examples, a rule could specify that the average of the temperature values from two corresponding pixels be used.

Accordingly, in the example of FIG. 6, the 3D thermal model generated by overlay operation 330 includes thermal image data that is a composite of thermal image data derived from multiple thermal image cameras 108(1) and 108(2).

In example embodiments, virtual image module 106 produces virtual thermal images 345 for a plurality of fuel tank system components output from industrial thermal welding process 116 during a manufacturing process period (e.g. a manufacturing shift). In this regard, virtual image module 106 generates one or more respective virtual 2D thermal images 345 for each nozzle and tank component 120A, 120B for the plurality fuel tank system components 120 output during a manufacturing period. Virtual thermal images 345 define thermal profiles for each of the surface regions 142 and 144 at the moment of post-heating/pre-joining for fuel tank system components 120. In example embodiments, virtual image module 106 is configured to store virtual thermal images 345 locally and/or send or transmit the virtual thermal images 345 to other modules of system 100 for use for one or more of quality monitoring, process control, and process training purposes.

In this regard, as noted above, image control module 104 is configured to receive virtual thermal image data, namely virtual thermal images 345, from virtual image module 106, and in some examples, optical image data from one or more optical image cameras 110. The image control module 104 is configured to process the received image data and take actions based on such processing. In some examples, the actions may include classifying a target component 120 as passing or failing a quality standard. In some examples, the actions may include generating control instructions for process control module 112. In some examples, the actions may include transmitting data, including image data, to configuration module 124 and/or client module 128.

In example embodiments, image control module 104 is configured with one or more prediction functions $Y=f(X)$ that are configured to estimate in real time one or more attributes of the components 120A and 120B based on the thermal profile data included in virtual thermal images 345, where Y indicates a predicted value and X represents the 2D array of temperature values embedded in one or more thermal images 345. In an example embodiment, one or more of the attributes Y that image control module 104 is configured to predict include attributes that are indicative of the quality of the thermal weld joint formed in component 120 between components 120A and 120B by industrial process 116. By way of non-limiting example, estimated attributes may be real value attributes that include: $y_{A1}$=melt distance of component 120A at surface region 142; $y_{A2}$=melt distance to a protective layer in component 120A; $y_{B1}$=melt distance of component 120B at surface region 144; and $y_{B2}$=melt distance to a protective layer in component 120B. In example embodiments, image control module 104 is configured with a first prediction function $Y_A=f(X)$ for processing thermal images 345 corresponding to components 120A and a second prediction function $Y_B=f(X)$ for processing thermal images 345 corresponding to components 120B. First prediction function and second prediction function may in some example include further prediction sub-functions, each being configured to predict a specific attribute (e.g. $y_{A1}=f_{A1}(X)$, etc). In at least some examples, some or all of the prediction functions may be machine learned functions that have been learned by training a machine learning algorithm, as describe in greater detail below. In some examples, some or all of the prediction functions may be regression functions that output real value attributes (e.g. melt distances), and in some examples some or all of the functions may be classification functions that estimate a class attribute (e.g. fail or pass) from among a set off candidate classes.

In some examples image control module 104 is configured to implement one or more further functions, which may be rules-based determinative functions, that generate output attributes based on the attributes output by one or more predictive functions. For example, a rules based function could be "If ($y_{A1}$>threshold$_{A1}$) and ($y_{A2}$>threshold$_{A2}$) and ($y_{B1}$>threshold$_{B1}$) and ($y_{B2}$>threshold$_{B2}$) then weld joint for component 120 passes quality assessment otherwise weld joint for component 120 fails quality assessment" (where threshold(s)$_{A1\ to\ B2}$ are respective predefined melt distance thresholds). In some examples image control module 104 is configured to take different actions based on determined output attributes, including for example sending a message to a further module such as one or both of process control module 112, client module 128 and configuration module indicating that the component 120 associated with component ID 146 has "passed" or "failed" the weld joint quality assessment. Such message may for example be a control instruction for process control module 112 to activate a process control unit 136 to route the component 120 in either a first direction or a second direction based on a "passed" or "failed" assessment. The message may cause client module 128 to issue an alert message for an operator indicating a "failed" assessment.

In some examples, or more of the functions implemented by image control module 104 may be configured to estimate attributes that may be used to automatically adjust industrial process. For example, one or more learned predictive functions may be configured to generate, based one or more virtual thermal images 345, a real value attribute indicating an estimated change to a process control variable. An example of such an attribute may be "3.5 degree" for an increase in the heating temperature applied to component 120A. The image control module 104 can then provide a message in the form of a control instruction to the process control module 112 to increase the heating temperature applied to future components 120A by 3.5 degrees going forward.

As noted above, one or more of the predictive functions implemented by image control module 104 may be machine learned functions that have been learned by a machine learning algorithm. As discussed below, in example embodiments configuration module 124, client module 128 and image control module 104 interact with each other to collect training data, learn the predictive functions, and deploy the predictive functions to image control module 104. In some examples, the processing performed by predictive functions on input thermal images is defined by a set of learned parameters W, and learning the predictive functions comprises learning parameters W at the configuration module 124 using a machine learning algorithm and training data.

Figure 7:
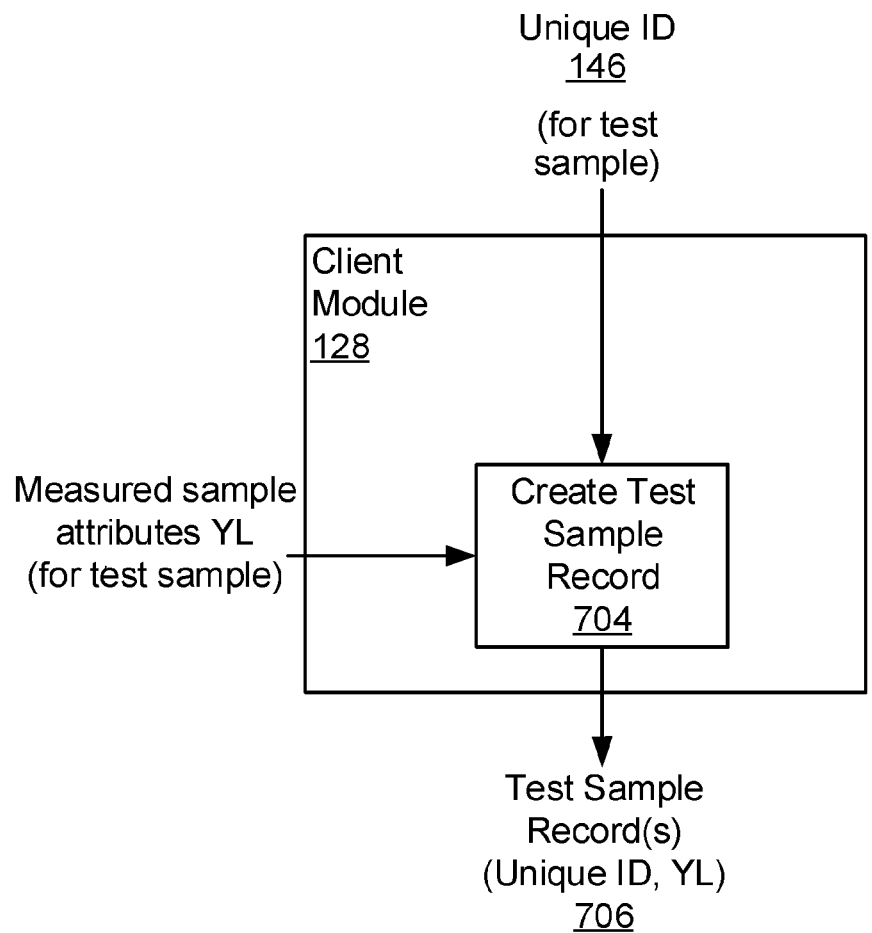
FIG. 7 is a block diagram of operations performed by a client module of the system of FIGS. 1 and 2 according to example embodiments.

According to example embodiments, training data is collected over an initial configuration period for industrial process 116. In one example embodiment, during an initial configuration period, virtual thermal images 345 are generated by virtual imaging module for a plurality of components 120A, 120B over multiple manufacturing periods. In some examples, a manufacturing period is a duration of time over which process variables are assumed to be relatively constant, and may coincide with a manufacturing shift such as an 8-hour period. These virtual thermal images 345, each of which is respectively associated with a unique component ID for component 120 (e.g. metadata for each virtual thermal image 345 may include a respective component ID), are provided to image control module 104. During the initial configuration period, during each manufacturing period a test sample that comprises a sub-set of the assembled tank system components 120 output by industrial process 116 are selected for quality verification analysis. By way of non-liming example, a sample of two assembled tank system components 120 output from industrial process 116 may be selected at during a manufacturing period for quality verification analysis. The test samples may be selected at different times during the manufacturing period (e.g. within first 30 minutes and within last 30 minutes). The test samples are subjected to destructive analysis in which a cross-section of the weld joint between the components 120A and 120B is analyzed to physically measure sample attributes YL, including for example $yL_{A1}$=melt distance of component 120A at surface region 142; $yL_{A2}$=melt distance to a protective layer of component 120A; $yL_{B1}$=melt distance of component 120B at surface region 144; and $yL_{B2}$=melt distance of to a protective layer component 120B. In example embodiments, as illustrated in FIG. 7, client module 128 may be configured to perform the following: (1) receive unique component ID 146 for a test sample component 120 through an interface device (e.g. barcode or RFID reader); (2) receive measured sample attributes YL for test sample component 120 through an interface device (e.g. through a digital measurement device such as an electronic caliper or laser measurement device or manual operator keyboard entry); (3) as indicated by block 704, create and store test sample record 706 including unique ID and measured sample attributes YL. Accordingly, over multiple manufacturing periods, client module 106 can generate a growing set of test sample records.

In example embodiments the test sample records 706 are communicated to configuration module 124, along with virtual thermal images 345 to be used for training purposes. In this regard, FIG. 8 illustrates an example of operations that may be performed at configuration module 124 during an initial configuration period. As indicated by merge operation 802, in example embodiments, configuration module 124: (1) receives virtual 2D thermal images 345 (which may for example be communicated to configuration module 106 by image control module 104 via a combination of networks 118 and 132); and (2) receives test sample records 706 (which may for example be communicated to configuration module 106 by client module 128 via a combination of networks 118 and 132). Merge operation 802 is configured to associate, based on unique component IDs 146, the virtual thermal images 345 generated in respect of each test sample component 120 (e.g. the post-heat/pre-join virtual thermal images 345 of the components 120A and 120B that were welded together to form test sample component 120) with the test sample records 706 generated in respect of the test sample component 120 and thereby provide a training set of labelled training data 804. It will be appreciated that in some examples, merging of the virtual thermal images 345 and test sample records may be performed at a different module such as image control module 106 or client module 128.

In at least some example embodiments, multiple similar industrial processes 116 for producing identical components 120 may exist at a particular industrial process location or may distributed among multiple industrial process locations. Each such industrial process 116 may be similarly configured with system modules that enable respective sets of virtual thermal images 345 and test sample records 706 to be generated in respect of the each of the processes. Accordingly, in some example embodiments, the merge operation 802 of configuration module may be configured to generate labeled training data 804 that is a compilation of virtual thermal images 345 and test sample records 706 from multiple industrial processes 116 producing the same components 120. It will be appreciated that this can provide an enhanced amount of labeled training data that can be used to learn prediction functions.

As indicated in FIG. 8, configuration module 106 is configured to perform a learning operation 806 to learn one or more prediction functions Y=f(X) based on labelled training data 804. As noted above, learned prediction functions Y=f(X) can be used by image control module 104 to estimate one or more attributes of the components 120A, 120B and/or 120 based on the thermal profile data included in virtual thermal images 345. In at least some examples, learning operation 806 applies one or more machine learning algorithms to learn one or more prediction functions.

By way of example, a machine learning regression algorithm can be used by configuration module 106 to learn a first prediction function $Y_{A1}=f_{A1}(X)$ that can output real value attribute $y_{A1}$=melt distance of component 120A at surface region 142, where X is the 2D array of temperature values from a virtual thermal image 345 of component 120A. In this regard, labelled training data 804 includes a plurality of samples of virtual thermal images 345 of components 120A together with respective measured attributes $yL_{A1}$ (melt distance of component 120A at surface region 142). The prediction function $Y_{A1}=f_{A1}(X)$ is learned through an iterative regression algorithm using this labelled training data 804. In some examples, the parameters W for implementing prediction function $Y_{A1}=f_{A1}(X)$ are learned. An example of a machine learning regression algorithm that can be used for this purpose is a convolutional neural network regression.

In a similar manner, similar prediction functions can be learned for predicting $y_{A2}$=melt distance of component 120A to a protective layer; $y_{B1}$=melt distance of component 120B at surface region 144; and $y_{B2}$=melt distance of component 120B to a protective layer.

Once the prediction functions are learned, the configuration modules can then communicate the learned prediction functions through one or more networks 118, 132 to one or more image control modules 104 so that the learned prediction functions can be applied in the manner noted above. In some examples, communicating the learned prediction functions includes sending the parameters W that have been learned in respect of the functions, thereby enabling image control module 104 to implement the prediction function.

In some examples, after an initial configuration of the system 100 is performed, the prediction functions may be periodically updated. In this regard, the labeled training data 804 may be supplemented over time with new thermal images 345 and corresponding test sample records 706, and the updated labelled training data then used by learning operation 806 to relearn the relevant prediction functions that can then be deployed to one or more image control modules 104.

The prediction functions described above are one example of many different possible prediction functions that could be learned at configuration module 124 for deployment at image control modules 104 across one or more systems 100. As previously noted, in some cases the prediction functions may be configured to output attributes indicative of weld joint quality in real time as the weld joint is being formed; in some examples, the prediction functions may be configured to output attributes that can allow for real time automated adjustment of process parameters. In some examples, prediction functions may include classification functions in place of or in addition to regression functions. In some examples, neural network structures could be used to implement prediction functions.

As noted above, in example embodiments the attributes used for training the predictive functions are derived through measurements performed during destructive testing of sample fuel system tank components 120. Accordingly, building a suitable dataset of labelled training data 804 may in some applications be time consuming and costly. Using too small a training dataset may result in problems such as overfitting. Accordingly, in example embodiments system 100 is configured to increase the amount of labelled training data available from a limited set of component test samples. In particular, in some examples, virtual image module 106 is configured to generate multiple virtual thermal image 345 realizations from each observed thermal image 304, thus providing multiple virtual thermal images 345 associated with each component 120A, 120B. The target attributes that are measured during quality verification analysis in respect of a single assembled fuel tank system component 120 can then be applied as training labels to the multiple virtual thermal images 345 of the respective components 120A, 120B that are joined to form the single assembled fuel tank system component 120, resulting in an enlarged set of labeled training data 804.

In one example embodiment, virtual image module 106 is configured to generate multiple virtual thermal image 345 realizations in respect of a single fuel tank system component 120 by using thermal image optimization operation 320 to generate multiple optimized thermal images 322 in respect of each observed thermal image 304. As noted above, in example embodiments thermal image optimization operation 320 is implemented using a stochastic optimization algorithm, such that each different application of the algorithm will result with in a randomized realization of the observed thermal image 302 within the constraints of the algorithm. In example embodiments, the virtual image module 106 then performs thermal image on 3D model overlay operation 330 and virtual 2D thermal image generation operation 340 independently on each of the multiple optimized thermal images 322, resulting in a plurality of virtual thermal images 345 for the same virtual camera perspective 335 in respect of a single observed thermal image 304.

In some example embodiments, the number of virtual thermal images 345 generated by virtual image model 106 in respect of an observed thermal image 304 is increased by configuring virtual 2D thermal image generation operation 340 to output virtual thermal images for each of a plurality of virtual camera perspectives 335.

Accordingly, the number of virtual thermal images that can be labelled for use as training data based on actual target attribute measurements obtained from a single component 120 can be amplified. Additionally, in some examples, the additional virtual thermal images could also be used during real-time analysis to provide additional input data to learned functions implemented on image control module 104.

Figure 9:
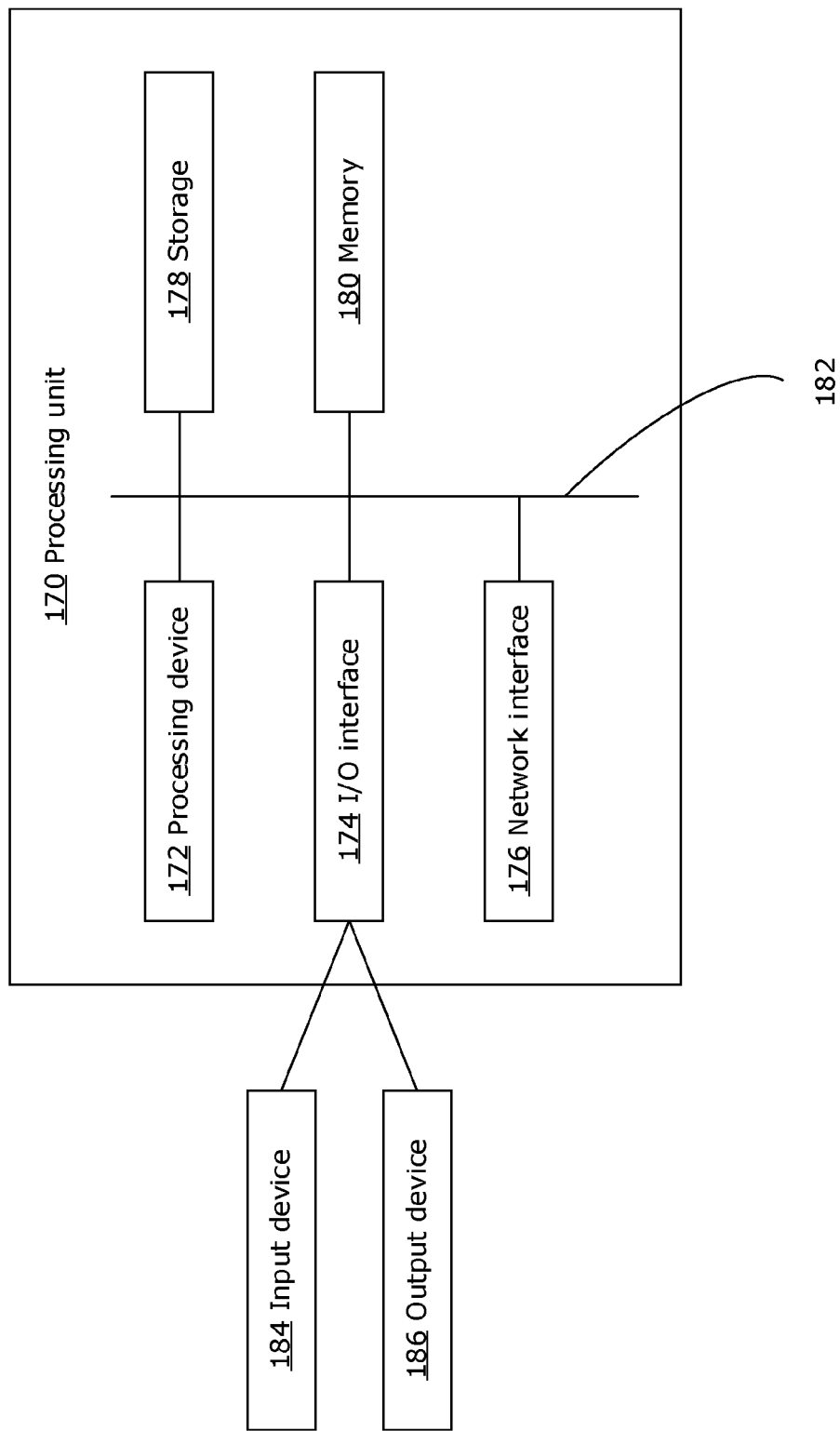
FIG. 9 is a block diagram of a processing unit that can be used to implement modules of the system of FIGS. 1 and 2 according to example embodiments.

FIG. 9 is a block diagram of an example processing unit 170, which may be used to implement the modules of system 100. Processing unit 170 may be used in a computer device to execute machine executable instructions that implement one or more of the modules or parts of the modules of system 100. Other processing units suitable for implementing embodiments described in the present disclosure may be used, which may include components different from those discussed below. Although FIG. 9 shows a single instance of each component, there may be multiple instances of each component in the processing unit 170.

The processing unit 170 may include one or more processing devices 172, such as a processor, a microprocessor, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network (e.g with networks 118 or 132).

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure are incorporated herein by reference.

The invention claimed is:

1. A computer implemented method comprising:
obtaining a virtual thermal camera perspective;
mapping temperature values from a two dimensional (2D) thermal image of a component to a three dimensional (3D) drawing model of the component to generate a 3D thermal model of the component;
mapping temperature values from the 3D thermal model to a 2D virtual thermal image corresponding to the virtual thermal camera perspective; and
predicting an attribute for the component by applying a machine learning based prediction function to the 2D virtual thermal image, wherein the prediction function has been trained using plurality of virtual thermal training images that correspond to the virtual thermal camera perspective.

2. The computer implemented method of claim 1 wherein:
the 2D thermal image comprises a two dimensional array of pixels that have respective temperature values assigned thereto, and the 3D drawing model comprises a plurality of polygons that model a physical shape of the component, wherein mapping temperature values from the 2D thermal image to the three dimensional 3D drawing model comprises mapping temperature values assigned to pixels to one or more of the polygons.

3. The computer implemented method of claim 1 comprising:
generating the 2D thermal image of the component by manipulating temperature values of an observed thermal image of the component to correspond to expected geophysical parameters.

4. The computer implemented method of claim 3 wherein generating the 2D thermal image comprises applying a stochastic optimization function to the observed thermal image.

5. The computer implemented method of claim 4 comprising generating a plurality of the 2D thermal images of the component by repeatedly applying the stochastic optimization function to the observed thermal image.

6. The computer implemented method of claim 5 comprising receiving a measured physical attribute of the component and labelling each of the plurality of 2D thermal images with the same measured physical attribute to generate a plurality of labelled samples for a training dataset for learning the prediction function.

7. The computer implemented method of claim 1 further comprising mapping temperature values from a second 2D thermal image of the component, in addition to temperature values of the 2D thermal image, to the 3D drawing model to generate the 3D thermal model of the component, the thermal 2D image and the second 2D thermal image each corresponding to a different thermal camera perspective.

8. The computer implemented method of claim 1 further comprising:
mapping temperature values from respective two dimensional (2D) thermal images of a plurality of identical sample components to a plurality of respective three dimensional (3D) drawing models to generate respective 3D thermal models for each of the sample components;

mapping temperature values from the 3D thermal models to respective 2D virtual thermal images for each of the sample components corresponding to the virtual thermal camera perspective to obtain the virtual thermal training images;

receiving a measured physical attribute for each of the plurality of sample components and labelling the respective 2D virtual thermal image of each sample component with the measured physical attribute;

combining the labelled 2D virtual thermal images of the sample components into a labelled training data set for training the predictive function; and training, using a machine learning algorithm, the predictive function based on the labelled training data set.

9. The computer implemented method of claim 8 wherein at least some of the 2D thermal images of the plurality of identical sample components are derived from thermal imaging cameras positioned at multiple industrial processes.

10. The computer implemented method of claim 1 wherein the 2D thermal image is derived from a thermal imaging camera scanning the component during a thermal welding process, and the predicted attribute is indicative of a quality of a future weld joint between the component and a further object.

11. The method of claim 10 wherein the method further comprises:
obtaining a further virtual thermal camera perspective;
mapping temperature values from a two dimensional (2D) thermal image of the further object to a three dimensional (3D) drawing model of the further object to generate a 3D thermal model of the further object;
mapping temperature values from the 3D thermal model of the further object to a 2D virtual thermal image of the further object corresponding to the further virtual thermal camera perspective; and
predicting a further attribute for the further object by applying a further machine learning based prediction function to the 2D virtual thermal image of the further object, wherein the further prediction function has been trained using a further plurality of virtual thermal training images that correspond to the further virtual thermal camera perspective;
wherein the 2D thermal image of the further object is derived from a further thermal imaging camera scanning the further object during the thermal welding process and the predicted further attribute is also indicative of the quality of the future weld joint between the component and a further object.

12. The method of claim 11 wherein both the 2D thermal image of the component and the 2D thermal image of the further object are taken during the thermal welding process at a point after heating of respective surfaces of the component and the further object that are to be joined together to form the future weld joint, prior to the joining.

13. The method of claim 12 wherein the component is a fill nozzle and the further object is a tank component that are configured to collectively form a fuel system tank component.

14. The computer implemented method of claim 1 wherein the predicted attribute is a melt distance.

15. The computer implemented method of claim 1 wherein the predicted attribute is indicative of a quality metric related to the component, the method further comprising instructing an industrial process action based on the predicted attribute.

16. The computer implemented method of claim 1, comprising classifying the component as passing or failing a quality assurance threshold based on the predicted attribute.

17. A system comprising:
a thermal image camera for scanning a component at an industrial process to generate an observed 2D thermal image of the component at a predetermined location in the industrial process, the 2D thermal image comprising a two dimensional array of pixels each having an assigned temperature value;
one or more processing units that each comprise a processing device and a storage storing instructions for the processing device, the instructions collectively configuring the one or more processing units to:
generate a 3D thermal model of the component by mapping the temperature values to respective polygons of a three dimensional (3D) drawing model of the component based on an expected perspective of the thermal image camera relative to the component;
generate a 2D virtual thermal image corresponding to a virtual thermal camera perspective by mapping temperature values from the 3D thermal model based on the virtual thermal camera perspective; and
predict an attribute for the component by applying a prediction function to the 2D virtual thermal image, wherein the prediction function has been trained using a plurality of virtual thermal training images that correspond to the virtual thermal camera perspective.

18. The system of claim 17 wherein the one or more processing units are configured to:
generate an optimized 2D thermal image realization of the observed 2D thermal image by manipulating the temperature values based on an expected geophysical parameters, wherein the 3D thermal model is generated by mapping the temperature values based on their locations in the optimized 2D thermal image realization.

19. The system of claim 18 wherein the optimized 2D thermal image realization is generated by applying a stochastic optimization function to the observed 2D thermal image.

20. The system of claim 19 wherein the one or more processing units are configured to generate a plurality of the 2D thermal image realizations of the component by repeatedly applying the stochastic optimization function to the observed thermal image.

21. The system of claim 20 wherein the one or more processing units are configured to receive a measured physical attribute of the component and label each of the plurality of 2D thermal images with the same measured physical attribute to generate a plurality of labelled samples for a training dataset for learning the prediction function.

22. The system of claim 17 comprising a second thermal image camera for scanning the component from a different thermal camera image perspective to generate a further observed 2D thermal image of the component at the predetermined location in the industrial process, wherein the one or more processing units are configured to also map temperature values derived from the further observed 2D thermal image to the 3D drawing model to generate the 3D thermal model of the component.

23. The system of claim 17, comprising a plurality of thermal image cameras for scanning a plurality of identical sample components at a plurality of industrial processes to generate respective observed 2D thermal images of the components;
  wherein the one or more processing units are configured to:
    map temperature values from the plurality of observed 2D thermal images to a plurality of respective 3D drawing models to generate respective 3D thermal models for each of the sample components and map temperature values from the 3D thermal models to respective 2D virtual thermal images for each of the sample components corresponding to the virtual thermal camera perspective;
    receive a measured physical attribute for each of the plurality of sample components and label the respective 2D virtual thermal image of the sample component with the measured physical attribute;
  combine the labelled 2D virtual thermal images of the sample components into a labelled training data set for training the predictive function; and
  train, using a machine learning algorithm, the predictive function based on the labelled training data set.

24. A computer implemented method comprising:
  generating a 2D thermal image of a component by manipulating temperature values of an observed thermal image of the component to correspond to expected geophysical parameters;
  mapping temperature values from the two dimensional (2D) thermal image of the component to a three dimensional (3D) drawing model of the component to generate a 3D thermal model of the component;
  mapping temperature values from the 3D thermal model to a 2D virtual thermal image corresponding to a virtual thermal camera perspective; and
  predicting an attribute for the component by applying a prediction function to the 2D virtual thermal image.

25. A system comprising:
  a thermal image camera for scanning a component at an industrial process to generate an observed 2D thermal image of the component at a predetermined location in the industrial process, the 2D thermal image comprising a two dimensional array of pixels each having an assigned temperature value;
  one or more processing units that each comprise a processing device and a storage storing instructions for the processing device, the instructions collectively configuring the one or more processing units to:
  generate an optimized 2D thermal image realization of the observed 2D thermal image by manipulating the temperature values based on an expected geophysical parameters;
  generate a 3D thermal model of the component by mapping the temperature values based on their locations in the optimized 2D thermal image realization to respective polygons of a three dimensional (3D) drawing model of the component based on an expected perspective of the thermal image camera relative to the component;
  generate a 2D virtual thermal image corresponding to a virtual thermal camera perspective by mapping temperature values from the 3D thermal model based on the virtual thermal camera perspective; and
  predict an attribute for the component by applying a prediction function to the 2D virtual thermal image.

* * * * *